(12) United States Patent
Al Hamouz et al.

(10) Patent No.: US 11,760,827 B2
(45) Date of Patent: *Sep. 19, 2023

(54) MELAMINE-BASED CROSSLINKED POLYMER MANNICH PRODUCT

(71) Applicant: KING FAHD UNIVERSITY OF PETROLEUM AND MINERALS, Dhahran (SA)

(72) Inventors: Othman Charles Sadeq Al Hamouz, Dhahran (SA); Mohammed Estatie, Dhahran (SA); Tawfik Abdo Saleh Awadh, Dhahran (SA); Mohamed A. Morsy, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,348

(22) Filed: Dec. 8, 2022

(65) Prior Publication Data

US 2023/0140110 A1    May 4, 2023

Related U.S. Application Data

(63) Continuation of application No. 15/924,151, filed on Mar. 16, 2018, now Pat. No. 11,530,289.
(Continued)

(51) Int. Cl.
*C08G 14/06* (2006.01)
*C02F 1/28* (2023.01)
(Continued)

(52) U.S. Cl.
CPC ............ *C08G 14/06* (2013.01); *B01J 20/264* (2013.01); *B01J 20/267* (2013.01);
(Continued)

(58) Field of Classification Search
None
See application file for complete search history.

(56) References Cited

U.S. PATENT DOCUMENTS

| 2002/0028887 A1 | 3/2002 | Hirano | |
| 2008/0203012 A1* | 8/2008 | Yeager | B01D 67/0093 |
| | | | 210/500.36 |

(Continued)

FOREIGN PATENT DOCUMENTS

| CN | 103232598 B | 8/2013 |
| CN | 105504344 A | 4/2016 |
| WO | WO 2008/134474 A2 | 11/2008 |

OTHER PUBLICATIONS

Al Hamouz, et al. "Lead ion removal by novel highly cross-linked Mannich based polymers" Journal of the Taiwan Institute of Chemical Engineers, vol. 70, Jan. 2017, pp. 345-351 (Abstract Only).
(Continued)

*Primary Examiner* — Jonathan M Peo
(74) *Attorney, Agent, or Firm* — Oblon, McClelland, Maier & Neustadt, L.L.P.

(57) ABSTRACT

Crosslinked polymers made up of polymerized units of cyclic diaminoalkane, aldehyde and bisphenol-S or melamine. A method for removing heavy metals, such as Pb(II) from an aqueous solution or an industrial wastewater sample with these crosslinked polymers is introduced. A process of synthesizing the crosslinked polymers is also described.

15 Claims, 10 Drawing Sheets

Related U.S. Application Data

(60) Provisional application No. 62/563,943, filed on Sep. 27, 2017.

(51) Int. Cl.

| | | |
|---|---|---|
| *B01J 39/19* | (2017.01) | |
| *B01J 20/26* | (2006.01) | |
| *C08G 12/26* | (2006.01) | |
| *B01J 20/34* | (2006.01) | |
| *B01J 20/28* | (2006.01) | |
| *C02F 101/22* | (2006.01) | |
| *C02F 1/00* | (2023.01) | |
| *C02F 101/20* | (2006.01) | |

(52) U.S. Cl.
CPC ... *B01J 20/28004* (2013.01); *B01J 20/28059* (2013.01); *B01J 20/3425* (2013.01); *B01J 20/3475* (2013.01); *B01J 39/19* (2017.01); *C02F 1/285* (2013.01); *C08G 12/266* (2013.01); *C02F 1/001* (2013.01); *C02F 2101/20* (2013.01); *C02F 2101/206* (2013.01); *C02F 2101/22* (2013.01)

(56) References Cited

U.S. PATENT DOCUMENTS

| | | |
|---|---|---|
| 2013/0302694 A1 | 11/2013 | von Ben ten |
| 2016/0016821 A1* | 1/2016 | Al Hamouz ............ C02F 1/285 |
| | | 521/39 |
| 2016/0332893 A1 | 11/2016 | Al Hamouz |

OTHER PUBLICATIONS

Rotroff, et al. "Predictive Endocrine Testing in the 21st Century Using in Vitro Assays of Estrogen Receptor Signaling Responses" Environmental Science and Technology, vol. 48, Issue 15, Jun. 2014, pp. 8706-8716.

Wambaugh, et al. "High-Throughput Models for Exposure-Based Chemical Prioritization in the ExpoCast Project" Environmental Science and Technology, vol. 47, Issue 15, Jun. 2013, pp. 8479-8488. (Abstract Only).

Hu L-L, et al. Predicting Biological Functions of Compounds Based on Chemical-Chemical Interactions. PLoS One vol. 6, Issue 12, Dec. 2011, pp. 1-9.

* cited by examiner

MELAMINE-BASED CROSSLINKED POLYMER MANNICH PRODUCT

CROSS REFERENCE TO RELATED APPLICATIONS

The present application is a Continuation of U.S. application Ser. No. 15/924,151, now allowed, having a filing date of Mar. 16, 2018, which claims benefit of priority to U.S. Provisional Application No. 62/563,943, having a filing date of Sep. 27, 2017.

STATEMENT OF FUNDING ACKNOWLEDGEMENT

This project was funded by King Abdulaziz City for Science and Technology under project number AT-35-131 and King Fahd University of Petroleum and Minerals.

STATEMENT REGARDING PRIOR DISCLOSURE BY THE INVENTORS

Aspects of this technology are described in an article "Lead ion removal by novel highly cross-linked Mannich based polymers" published in Journal of the Taiwan Institute of Chemical Engineers, 2017, 70, 345-351, on Oct. 28, 2016, which is incorporated herein by reference in its entirety.

BACKGROUND OF THE INVENTION

Technical Field

The present disclosure relates to crosslinked polymers produced from polycondensation reactions of a cyclic diaminoalkane, an aldehyde, and a bisphenol-S compound or melamine, methods of preparing the crosslinked polymers, and a method of removing heavy metal ions, such as lead(II) from aqueous solutions by adsorbing the metal ions with the crosslinked polymers.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wastewater containing toxic and non-biodegradable heavy metal ions such as $Cd^{2+}$, $Cu^{2+}$, $Cr^{2+}$, $Fe^{3+}$, $Pb^{2+}$ and $Hg^{2+}$ discharged from industrial processes, e.g. mining, power generation, metal finishing, electronic device manufacturing and leather tanning has become an issue due to its potential damage to human health and environment. Some heavy metals have a carcinogenic effect and no nutritional value to the human body. Therefore, regulations on removing or minimizing toxic heavy metals have been imposed worldwide. A sustainable and environment-friendly process is much needed for removal of such pollutants [Alsohaimi I H, Wabaidur S M, Kumar M, Khan M A, Alothman Z A, Abdalla M A. Synthesis, characterization of PMDA/TMSPEDA hybrid nano-composite and its applications as an adsorbent for the removal of bivalent heavy metals ions. Chem Eng J 2015; 270: 9-21; Dong Z, Zhang F, Wang D, Liu X, Jin J. Polydopamine-mediated surface-functionalization of graphene oxide for heavy metal ions removal. J Solid State Chem 2015; 224: 88-93; Kumari M, Tripathi B D. Efficiency of *Phragmites australis* and *Typha latifolia* for heavy metal removal from wastewater. Ecotoxicol Environ Saf 2015; 112: 80-86; and Wu Q, Cui Y, Li Q, Sun J. Effective removal of heavy metals from industrial sludge with the aid of a biodegradable chelating ligand GLDA. J Hazard Mater 2015; 283: 748-754].

Lead metal is toxic, non-biodegradable and tends to bio-accumulate in living systems even at trace levels. Lead causes severe damage to organs such as kidney, brain, liver, reproductive and nervous systems [Kang K-S. The cause of highly efficient lead removal with silica spheres modifying the surface by a base catalyst. Ind Eng Chem Res 2012; 51(10): 4101-4104; and Liu Y, Yan J, Yuan D, Li Q, Wu X. The study of lead removal from aqueous solution using an electrochemical method with a stainless steel net electrode coated with single wall carbon nanotubes. Chem Eng J 2013; 218: 81-88]. Lead-based paint in older buildings is listed as a primary source of lead poisoning in drinking water [Mielke H W, Reagan P L. Soil is an important pathway of human lead exposure. Environ Health Perspect 1998; 106 (Suppl 1): 217-29; and Sanbom M D, Abelsohn A, Campbell M, Weir E. Identifying and managing adverse environmental health effects: 3. Lead exposure. CMAJ Can Med Assoc J 2002; 166(10): 1287-92]. Lead concentrations in drinking water should be below 10 parts per billion (ppb) according to world health organization (WHO). US environmental protection agency (EPA) has set a goal to reach zero contamination of lead in drinking water in the drinking water standards and health advisories [United state environmental protection agency (EPA). Drinking Water Standards and Health Advisories. Washington, D.C.: Office of Water U.S. Environmental Protection Agency; 2012; and World health organization (WHO). Guidelines for drinking-water quality. 3rd ed. Geneva, Switzerland: World Health Organization; 2006]. To achieve this goal, technologies including precipitation, coagulation, reverse osmosis, ion exchange, solvent extraction, flotation, and membrane separation have been developed to remove lead from wastewaters. Due to its high efficiency and low cost of operation, adsorption is considered a superior method for wastewater treatment [Celik A, Demirbas A. Removal of heavy metal ions from aqueous solutions via adsorption onto modified lignin from pulping wastes. Energy Sour 2005; 27(12): 1167-77; Dabrowski A. Adsorption—From theory to practice. Adv Colloid Interface Sci 2001; 93(1-3): 135-224; and Rozada F, Otero M, Morán A, García A I. Adsorption of heavy metals onto sewage sludge-derived materials. Bioresour Technol 2008; 99(14): 6332-8, each incorporated herein by reference in their entirety]. However, more efficient adsorbing materials for selective heavy metal removal in aqueous solutions are required to facilitate lead elimination in drinking water and other water systems.

In view of the forgoing, one objective of the present disclosure is to introduce crosslinked polymers produced from a polycondensation reaction of a cyclic diaminoalkane, an aldehyde, and a bisphenol-S compound or melamine. Another objective of the present disclosure is to provide a method for removing heavy metals, such as Pb(II) ions from an aqueous solution by employing the crosslinked polymers.

BRIEF SUMMARY OF THE INVENTION

According to a first aspect, the present disclosure relates to a crosslinked polymer, comprising reacted units of a first monomer of formula (I)

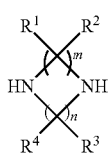

or a salt thereof, a solvate thereof, a stereoisomer thereof, or a mixture thereof, a second monomer, which is at least one selected from the group consisting of melamine and a bisphenol-S compound represented by formula (II)

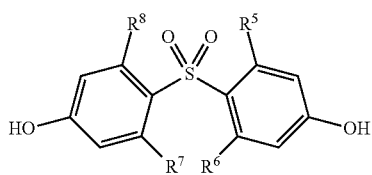

or a salt thereof, a solvate thereof, a tautomer thereof, a stereoisomer thereof, or a mixture thereof, and an aldehyde of formula (III)

or a salt thereof, a solvate thereof, a stereoisomer thereof, or a mixture thereof wherein (i) $R^1$, $R^2$, $R^3$, and $R^4$ are independently selected from the group consisting of a hydrogen, an optionally substituted alkyl, an optionally substituted cycloalkyl, an optionally substituted arylalkyl, and an optionally substituted aryl, (ii) $R^5$, $R^6$, $R^7$, and $R^8$ are independently selected from the group consisting of a hydrogen, an optionally substituted alkyl, an optionally substituted cycloalkyl, an optionally substituted arylalkyl, an optionally substituted alkoxy, and a halogen, (iii) $R^9$ is selected from the group consisting of a hydrogen, an optionally substituted alkyl, an optionally substituted cycloalkyl, an optionally substituted arylalkyl, and an optionally substituted aryl, and (iv) m and n are independently selected from 2 and 3.

In one embodiment, the second monomer is melamine, the molar ratio of the first monomer to melamine is in the range of 1.5:1 to 5:1, and the molar ratio of the aldehyde to melamine is in the range of 2:1 to 10:1.

In one embodiment, the second monomer is a bisphenol-S compound represented by formula (II), the molar ratio of the first monomer to the bisphenol-S compound is in the range of 1.2:1 to 4:1, and the molar ratio of the aldehyde to the bisphenol-S compound is in the range of 2:1 to 6:1.

In one embodiment, m and n are 2.

In one embodiment, the first monomer of formula (I) is piperazine.

In one embodiment, the second monomer is bisphenol-S.

In one embodiment, the aldehyde of formula (III) is formaldehyde.

In one embodiment, the crosslinked polymer has a BET surface area in the range of 10-80 $m^2/g$.

In one embodiment, wherein the second monomer is melamine, the crosslinked polymer exhibits a semi-crystalline structure.

According to a second aspect, the present disclosure relates to a method for removing a heavy metal from an aqueous solution, comprising (i) contacting the aqueous solution having an initial concentration of the heavy metal with the crosslinked polymer of claim 1 to form a mixture, and (ii) filtering the mixture to obtain an aqueous solution having a reduced concentration of the heavy metal compared to the initial concentration.

In one embodiment, the crosslinked polymer has an average particle size of 1-10 μm in diameter.

In one embodiment, the heavy metal is an ion of at least one heavy metal selected from the group consisting of Pb, Cd, As, Zn, Cu, Ni, Co, Mn, and Cr.

In one embodiment, the heavy metal is Pb(II).

In one embodiment, the aqueous solution has a pH in the range of 1 to 7.

In one embodiment, the initial concentration of the heavy metal in the aqueous solution ranges from 0.1 mg $L^{-1}$ to 50 mg $L^{-1}$.

In one embodiment, the crosslinked polymer is present at a concentration in the range of 0.1-10 g per liter of the aqueous solution during the contacting.

In one embodiment, the crosslinked polymer is contacted with the aqueous solution for 0.1-12 hours.

In one embodiment, the crosslinked polymer is contacted with the aqueous solution at a temperature in the range of 10° C. to 80° C.

In one embodiment, greater than 40% of a total mass of the heavy metal is removed from the aqueous solution.

In one embodiment, the first monomer is piperazine, the second monomer is bisphenol S, and the aldehyde is formaldehyde, the aqueous solution comprises Pb(II) and at least one additional heavy metal ion, which is an ion of at least one heavy metal selected from the group consisting of Cd, As, Zn, Cu, Ni, Co, Mn, and Cr, and greater than 95% of a total mass of Pb(II) is removed from the aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
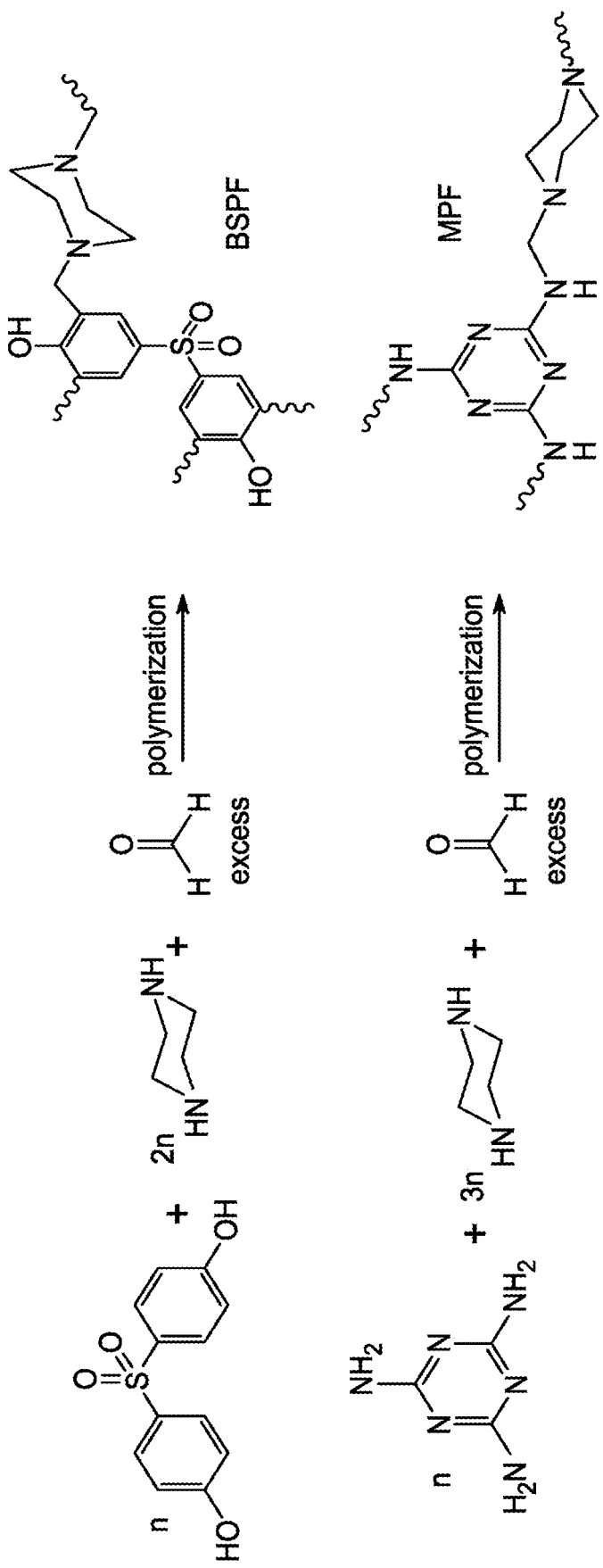
FIG. 1 are synthetic processes to form crosslinked polymer BSPF, wherein the first and second monomer are piperazine and bisphenol-S, respectively, and the aldehyde is formaldehyde, and crosslinked polymer MPF, wherein the first and second monomer are piperazine and melamine, respectively, and the aldehyde is formaldehyde.

Embodiments of the present disclosure will now be described more fully hereinafter with reference to the accompanying drawings, in which some, but not all embodiments of the disclosure are shown. The present disclosure will be better understood with reference to the following definitions.

Unless otherwise specified, "a" or "an" means "one or more". Within the description of this disclosure, where a numerical limit or range is stated, the endpoints are included unless stated otherwise. Also, all values and subranges within a numerical limit or range are specifically included as if explicitly written out.

As used herein, the term "compound" refers to a chemical entity, whether in a solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{15}N$, isotopes of oxygen include $^{17}O$ and $^{18}O$, and isotopes of sulfur include $^{33}S$ $^{34}S$ and $^{36}S$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —$SO_2NH_2$), substituted sulfonamide, nitro, cyano, carboxy, carbamyl (e.g. —$CONH_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{12}$, preferably $C_2$ to $C_8$, and specifically includes, but is not limited to, methyl, trifluoromethyl, ethyl, n-propyl, isopropyl, n-butyl, sec-butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "cycloalkyl" refers to cyclized alkyl groups. Exemplary cycloalkyl groups include, but are not limited to, cyclopropyl, cyclobutyl, cyclopentyl, cyclohexyl, norbomyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, halide, sulfonic acid, sulfate, phosphonic acid, phosphate or phosphonate or mixtures thereof. The substituted moiety may be either protected or unprotected as necessary, and as known to those skilled in the art.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "halogen" means fluoro, chloro, bromo and iodo.

According to a first aspect, the present disclosure relates to a crosslinked polymer, comprising reacted units of a first monomer of formula (I)

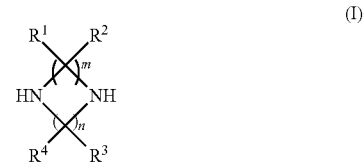

or a salt thereof, a solvate thereof, a stereoisomer thereof, or a mixture thereof, a second monomer, which is at least one selected from the group consisting of melamine and a bisphenol-S compound represented by formula (II)

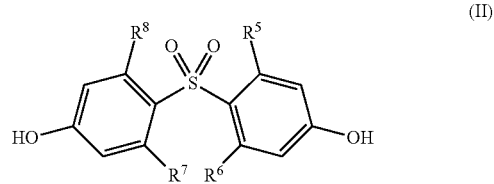

or a salt thereof, a solvate thereof, a tautomer thereof, a stereoisomer thereof, or a mixture thereof, and an aldehyde of formula (III)

or a salt thereof, a solvate thereof, a stereoisomer thereof, or a mixture thereof wherein (i) $R^1$, $R^2$, $R^3$, and $R^4$ are independently selected from the group consisting of a hydrogen, an optionally substituted alkyl, an optionally substituted cycloalkyl, an optionally substituted arylalkyl, and an optionally substituted aryl, (ii) $R^5$, $R^6$, $R^7$, and $R^8$ are independently selected from the group consisting of a hydrogen, an optionally substituted alkyl, an optionally substituted cycloalkyl, an optionally substituted arylalkyl, an optionally substituted alkoxy, and a halogen, (iii) $R^9$ is selected from the group consisting of a hydrogen, an optionally substituted alkyl, an optionally substituted cycloalkyl, an optionally substituted arylalkyl, and an optionally substituted aryl, and (iv) m and n are independently selected from 2 and 3.

As used herein, monomers are molecules which can undergo polymerization, thereby contributing constitutional repeating units to the structures of a macromolecule or polymer. The process by which monomers combine end to end to form a polymer is referred to herein as "polymerization". The term "degree of polymerization" refers to the number of repeating units in a polymer. As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc. As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc with the presence of at least one crosslinking monomer having more than two extension points, which is a monomer having more than two reactive sites. In certain embodiments, the bisphenol-S compound of formula (II) having four reactive sites (two ortho-positions next to the phenol group of each phenyl ring) functions as a crosslinking monomer, where each reactive position can act as an extension point and form a crosslink. In certain embodiments, the melamine having three reactive sites (three aniline groups) functions as a crosslinking monomer, where each aniline can act as an extension point and form a crosslink.

A "polycondensation" refers to a form of step growth polymerization where monomers join together by losing small molecules such as water or methanol, preferably water, as byproducts. This is in contrast to addition polymerizations which often involve reactions of unsaturated molecules. In one or more embodiment, the second monomer is melamine, and the crosslinked polymer disclosed herein is a polycondensation product of a three-component reaction of a first monomer of formula (I), melamine and an aldehyde of formula (III). In a preferred embodiment, the first monomer of formula (I) is present in a molar excess to melamine. In one embodiment, the molar ratio of the first monomer to melamine is in the range of 1.5:1 to 5:1, preferably 1.8:1 to 4.5:1, preferably 2:1 to 4:1, preferably 2.5:1 to 3.5:1, or about 3:1. In a preferred embodiment, the aldehyde of formula (III) is present in a molar excess to melamine. In one embodiment, the molar ratio of the aldehyde to melamine is in the range of 2:1 to 10:1, preferably 3:1 to 9:1, preferably 4:1 to 8:1, preferably 5:1 to 7:1, or about 6:1.

As used herein, a Mannich-type reaction or a Mannich-type polycondensation refers to a multi-component condensation of a nonenolizable aldehyde (e.g. paraformaldehyde), a primary or secondary amine or ammonia, and an enolizable compound such as a carbonyl, a phenol (Betti reaction), a nitrile, and an electron-rich heterocycle, e.g., furan, pyrrole, indole and thiophene. The Mannich-type reaction often involves a two-step reaction: addition of the amine or ammonia to the carbonyl carbon of the paraformaldehyde to form an electrophilic iminium ion, which is followed by attack of the electrophile by the enolizable compound. In one or more embodiments, the second monomer is the bisphenol-S compound represented by formula (II), and the crosslinked polymer disclosed herein is a polycondensation product via a Mannich-type reaction of a first monomer of formula (I), a bisphenol-S compound of formula (II), and an aldehyde of formula (III). In a preferred embodiment, the first monomer of formula (I) is present in a molar excess to the bisphenol-S compound of formula (II). In one embodiment, the molar ratio of the first monomer to the bisphenol-S compound is in the range of 1.2:1 to 4:1, preferably 1.4:1 to 3.5:1, preferably 1.6:1 to 3:1, preferably 1.8:1 to 2.5:1, or about 2:1. In a preferred embodiment, the aldehyde of formula (III) is present in a molar excess to the bisphenol-S compound of formula (II). In one embodiment, the molar ratio of the aldehyde to the bisphenol-S compound is in the range of 2:1 to 6:1, preferably 2.5:1 to 5.5:1, preferably 3:1 to 5:1, preferably 3.5:1 to 4.5:1, or about 4:1.

In one or more embodiments, m=n. In some embodiments, m and n are 2. In a preferred embodiment, the first monomer of formula (I) is piperazine

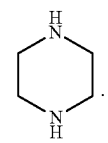

Piperazine

In some embodiments, m and n are 3. In a preferred embodiment, the first monomer of formula (I) is 1,5-diazocane

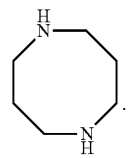

1,5-Diazocane

In some embodiments, m≠n. In a preferred embodiment, the first monomer of formula (I) is homopiperazine

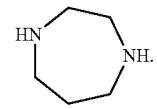

Homopiperazine

In certain embodiments, the second monomer can be other bisphenol compounds selected from the group consisting of 2,2-bis(4-hydroxyphenyl)propane, 1,1-bis(4-hydroxyphenyl)-1-phenyl-ethane, 2,2-bis(4-hydroxyphenyl) hexafluoropropane, 2,2-bis(4-hydroxyphenyl)butane, bis-(4-hydroxyphenyl)diphenylmethane, bis(4-hydroxyphenyl)-2,2-dichlorethylene, 1,1-bis(4-hydroxyphenyl)ethane, bis(4-hydroxydiphenyl)methane, 1,3-bis(2-(4-hydroxyphenyl)-2-propyl)benzene, 5,5'-(1-methylethyliden)-bis[1,1'-(bisphenyl)-2-ol]propane, 1,1-bis(4-hydroyphenyl)-3,3,5-trimethyl-cyclohexane, and 1,1-bis(4-hydroxyphenyl)-cyclohexane. Preferably the second monomer is bisphenol-S [bis(4-hydroxyphenyl)sulfone].

In one or more embodiments, the aldehyde of formula (III) is formaldehyde. In a preferred embodiment, the crosslinked polymer comprises polycondensed units of bisphenol-S, piperazine, and formaldehyde (i.e., BSPF). In another preferred embodiment, the crosslinked polymer comprises polycondensed units of melamine, piperazine, and formaldehyde (i.e., MPF).

In one embodiment, wherein the second monomer is melamine, the aldehyde of formula (III) is formaldehyde, and the first monomer is one or more compounds of formula (I), and $R^1$, $R^2$, $R^3$, $R^4$ are a hydrogen, the crosslinked polymer may be represented by formula (IV)

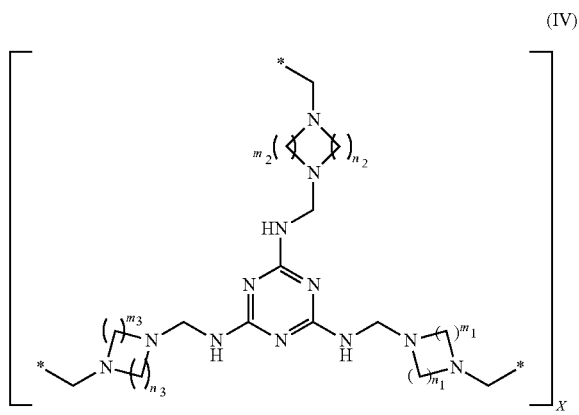

(IV)

or a salt, solvate or stereoisomer thereof wherein each m ($m_1$, $m_2$, $m_3$) and each n ($n_1$, $n_2$, $n_3$) are independently selected from 2 and 3, each "*" represents an amino site of an additional melamine ring, and X is a degree of polymerization in the range of 2-10000. In certain embodiments, the crosslinked polymer of the present disclosure may comprise different values of m, e.g. $m_1=m_2\neq m_3$, or $m_1\neq m_2=m_3$, or different values of n, e.g. $n_1=n_2\neq n_3$, or $n_1\neq n_2=n_3$. In a preferred embodiment, $m_1=m_2=m_3=2$, and $n_1=n_2=n_3=2$. In certain embodiments, one or more of the melamine rings may not be fully substituted at all three amino positions. For example, some melamine rings may only have two amino sites substituted, or one amino site substituted. Preferably, the melamine ring has all three amino sites substituted. In some embodiments, the crosslinked polymer comprises one or more 1,3,5-triazinane moieties formed by a cyclic trimerization of three melamine rings and three formaldehyde molecules [see FIG. 3].

In another embodiment, wherein the second monomer is bisphenol-S, the aldehyde of formula (III) is formaldehyde, and the first monomer is one or more compounds of formula (I), and $R_1$, $R_2$, $R_3$, $R_4$ are a hydrogen, the crosslinked polymer may be represented by formula (V)

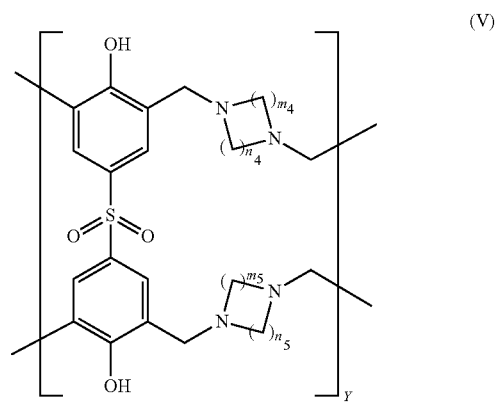

(V)

or a salt, solvate or stereoisomer thereof wherein each m ($m_4$, $m_5$) and each n ($n_4$, $n_5$) are independently selected from 2 and 3, and Y is a degree of polymerization in the range of 2-10000. In certain embodiments, the crosslinked polymer of the present disclosure may comprise different values of m ($m_4\neq m_5$), or different values of n ($n_4\neq n_5$). In a preferred embodiment, $m_4=m_5=2$, and $n_4=n_5=2$. In certain embodiments, one or more of the bisphenol rings may not be fully substituted at all 2-, 2'-, 6-, 6'-(ortho-) positions. For example, some bisphenol rings may only have three ortho-positions substituted, or two ortho-positions substituted. Preferably, the bisphenol unit has all four ortho-positions substituted.

In one or more embodiments, the degree of polymerization of the crosslinked polymer of formula (IV) represented by X is a positive integer in the range of 2-10000, preferably 2-5000, preferably 2-2500, preferably 2-1000, preferably 2-500, preferably 2-400, preferably 3-300, preferably 4-275, preferably 5-250, preferably 10-200, preferably 15-150, preferably 20-100, preferably 25-50. In one or more embodiments, the degree of polymerization of the crosslinked polymer of formula (V) represented by Y is a positive integer in the range of 2-10000, preferably 2-5000, preferably 2-2500, preferably 2-1000, preferably 2-500, preferably 2-400, preferably 3-300, preferably 4-275, preferably 5-250, preferably 10-200, preferably 15-150, preferably 20-100, preferably 25-50. It is equally envisaged that values for degree of polymerization may fall outside of these ranges and still provide suitable crosslinked polymers. In some embodiments, the crosslinked polymer of the present disclosure may have a wide molecular weight distribution. In one embodiment, the crosslinked polymer of the present disclosure has a number average molecular weight of 1-200 kDa, preferably 10-150 kDa, preferably 20-100 kDa, preferably 30-75 kDa, preferably 40-65 kDa, preferably 45-55 kDa.

The present disclosure also relates to a method of producing a crosslinked polymer wherein the second monomer is a bisphenol-S compound, comprising reacting a first monomer of formula (I) with a bisphenol-S compound and an aldehyde of formula (III) at the aforementioned molar ratio to form the crosslinked polymer. In a preferred embodiment, reacting the first monomer with the bisphenol-S compound and aldehyde to form the crosslinked polymer is performed in a polar aprotic solvent, preferably in dimethylformamide (DMF). Exemplary polar aprotic solvents that may be used in addition to, or in lieu of DMF include, but are not limited to, tetrahydrofuran, ethyl acetate, acetone, acetonitrile, dimethyl sulfoxide, nitromethane, propylene carbonate, and mixtures thereof. It is equally envisaged that the reaction may be adapted to be performed in a non-polar solvent such as pentane, cyclopentane, hexane, cyclohexane, benzene, toluene, 1,4-dioxane, diethyl ether, and dichloromethane. In a preferred embodiment, the reaction is performed at a concentration of the bisphenol-S compound in the range of 0.01-10.0 M, preferably 0.05-5.0 M, preferably 0.1-2.0 M, preferably 0.2-1.0 M, preferably 0.4-0.6 M. In a preferred embodiment, the reaction is performed under mechanical stirring, preferably a magnetic stirrer at a temperature of up to 115° C., preferably 20-110° C., preferably 40-105° C., preferably 60-100° C., preferably 80-95° C., or about 90° C. and has a reaction time of up to 48 hours, preferably 2-44 hours, preferably 8-38 hours, preferably 12-32 hours, preferably 18-30 hours, or about 24 hours. In a preferred embodiment, the crosslinked polymer is collected as a solid that may be separated (filtered off), soaked and washed in water and ethanol, and then filtered and dried. In one embodiment, the solid may be dried under vacuum at 20-100° C., preferably 40-80° C., or about 65° C. until a constant weight is achieved. In a preferred embodiment, the reaction has a product yield of at least 50%, preferably at least 60%, preferably at least 65%, preferably at least 70%, preferably at least 75%, preferably at least 80%. The product yield is calculated as (mass of product/total mass of reactants)×100%.

The present disclosure further relates to a method of producing a crosslinked polymer wherein the second monomer is melamine, comprising reacting a first monomer of formula (I) with melamine and an aldehyde of formula (III) at the aforementioned molar ratio to form the crosslinked polymer. In a preferred embodiment, reacting the first monomer with the melamine and aldehyde to form the crosslinked polymer is performed in a polar aprotic solvent, preferably in dimethylformamide (DMF). Aforementioned additional polar aprotic solvents and other non-polar solvents may be used in addition to, or in lieu of DMF. In a preferred embodiment, the reaction is performed at a concentration of melamine in the range of 0.01-10.0 M, preferably 0.05-5.0 M, preferably 0.1-2.0 M, preferably 0.2-1.0 M, preferably 0.3-0.5 M. In a preferred embodiment, the reaction is performed under mechanical stirring, preferably a magnetic stirrer at a temperature of up to 115° C., preferably 20-110° C., preferably 40-105° C., preferably 60-100° C., preferably 80-95° C., or about 90° C. and has a reaction time of up to 48 hours, preferably 2-44 hours, preferably 8-38 hours, preferably 12-32 hours, preferably 18-30 hours, or about 24 hours. In a preferred embodiment, the crosslinked polymer is collected as a solid that may be separated (filtered off), soaked and washed in acetone and ethanol, and then filtered and dried. In one embodiment, the solid may be dried under vacuum at 20-100° C., preferably 40-80° C., or about 65° C. until a constant weight is achieved. In a preferred embodiment, the reaction has a product yield of at least 50%, preferably at least 60%, preferably at least 65%, preferably at least 70%, preferably at least 75%, preferably at least 80%, preferably at least 85%. The product yield is calculated as (mass of product/total mass of reactants)×100%.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, BET surface area is measured by gas adsorption analysis, preferably $N_2$ adsorption analysis. In a preferred embodiment, the crosslinked polymer of the present disclosure has a BET surface area in the range of 10-80 $m^2/g$, preferably 15-75 $m^2/g$, preferably 20-70 $m^2/g$, preferably 30-60 $m^2/g$, preferably 40-58 $m^2/g$, preferably 45-50 $m^2/g$. In some embodiments, a crosslinked polymer comprising polycondensed units of bisphenol-S, piperazine, and formaldehyde (i.e., BSPF) has a larger BET surface area than a crosslinked polymer comprises polycondensed units of melamine, piperazine, and formaldehyde (i.e., MPF) by at least 50%-300%, 100%-250%, or 150%-200%.

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer.

The crosslinked polymer described herein may contain both crystalline and amorphous regions. In one or more embodiments, wherein the second monomer is melamine, the crosslinked polymer exhibits a semi-crystalline structure, which has a degree of crystallinity in the range of 0.1-0.8, preferably 0.2-0.6, preferably 0.3-0.5. In some embodiments, wherein the second monomer is bisphenol-S, the crosslinked polymer is amorphous. Methods for evaluating the degree of crystallinity include, but are not limited to, differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM).

According to a second aspect, the present disclosure relates to a method for removing a heavy metal from an aqueous solution, comprising (i) contacting the aqueous solution having an initial concentration of the heavy metal with the crosslinked polymer to form a mixture, and (ii) filtering the mixture to obtain an aqueous solution having a reduced concentration of the heavy metal compared to the initial concentration.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the crosslinked polymer of the present disclosure in any of its embodiments with heavy metal contaminated water sources and systems. The methods may be carried out in tanks, containers, or small scale applications in both batch mode and fixed-bed or column mode.

As used herein, a ligand refers to in inorganic chemistry an ion or molecule (functional group) that coordinates a metal atom to form a coordination complex. The binding between metal and ligand generally involves formal donation of one or more of the ligand's electron pairs. The nature of the metal-ligand bonding can range from covalent to ionic and the metal-ligand bond order can range from one to three.

Ligands are classified in many ways including, but not limited to, size (bulk), the identity of the coordinating atom(s), and the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate, and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the crosslinked polymer may adsorb or bind with one or more heavy metal ions by coordinating the metal ion at a site, e.g., a —NH— moiety through monodentate coordination, or polydentate chelation including, but not limited to bidentate chelation or tridentate chelation to the metal ion to form a heavy metal loaded crosslinked polymer.

The performance of an adsorbent material, polymers inclusive, is largely dependent on the type of functionality it carries. The presence of chelating functionalities such as amine, thiol, carbonyl, hydroxyl, and phosphoryl moieties is known to enhance the performance of materials towards the removal of heavy metal ions from aqueous solutions. In general, sulfur- and nitrogen-rich compounds exhibit a significant affinity towards heavy metals. Recently, chelating agents containing aminomethylphosphonate moieties were found to have unique properties as exchange resins for selective metal ion complexation, and chelating resins for heavy metal extraction from aqueous or fuel ethanolic solutions [Ripperger K P, Alexandratos S D. Polymer-supported phosphorus-containing ligands for selective metal ion complexation. In: Dabrowski A, editor. Studies in surface science and catalysis. Elsevier; 1999. p. 473-95; Wang M, Xu L, Peng J, Zhai M, Li J, Wei G. Adsorption and desorption of Sr(II) ions in the gels based on polysaccharide derivates. J Hazard Mater 2009; 171(1-3): 820-6; and Yamabe K, Ihara T, Jyo A. Metal ion selectivity of macroreticular chelating cation exchange resins with phosphonic acid groups attached to phenyl groups of a styrene-divinylbenzene copolymer matrix. Sep Sci Technol 2001; 36(15): 3511-28, each incorporated herein by reference in their entirety]. Singru et al. reported the synthesis of a polymer resin using melamine and p-cresol in the presence of formaldehyde and its application in removing heavy metals, e.g. $Pb^{2+}$, $Cd^{2+}$ from contaminated water [Singru R N, Gurnule W B, Khati V A, Zade A B, Dontulwar J R. Eco-friendly application of p-cresol-melamine-formaldehyde polymer resin as an ion-exchanger and its electrical and thermal study. Desalination 2010; 263(1-3): 200-10, incorporated herein by reference in its entirety]. Amino/polycarboxylic acid functionalized polymeric adsorbents that chelate heavy metal ions can be used for treating wastewater [Repo E, Warchol J K, Bhatnagar A, Mudhoo A, Sillanpaa M. Aminopolycarboxylic acid functionalized adsorbents for heavy metals removal from water. Water Res 2013; 47(14): 4812-32; and Wang L, Yang L, Li Y, Zhang Y, Ma X, Ye Z. Study on adsorption mechanism of Pb(II) and Cu(II) in aqueous solution using PS-EDTA resin. Chem Eng J 2010; 163(3): 364-72, each incorporated herein by reference in their entirety]. It was also reported that certain materials could be regenerated and recycled [Huang J, Ye M, Qu Y, Chu L, Chen R, He Q, et al. Pb(II) removal from aqueous media by EDTA-modified mesoporous silica SBA-15. J Colloid Interface Sci 2012; 385(1): 137-46, incorporated herein by reference in its entirety].

In a preferred embodiment, a heavy metal has a density of greater than 3.5 $g/cm^3$ and/or an atomic weight of greater than 20. Exemplary metal ions that can be adsorbed by the crosslinked polymer of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof in various oxidation states such as +1, +2 and +3. Further, these metal ions may be of any oxidation state $M^{+1}$, $M^{+2}$, $M^{+3}$, etc. In a preferred embodiment, the heavy metal is an ion of at least one heavy metal selected from the group consisting of Pb, Cd, As, Zn, Cu, Ni, Co, Mn, and Cr, most preferably the heavy metal is Pb(II). It is equally envisaged that the crosslinked polymer may be adapted or chemically modified to adsorb, incorporate and/or bind additional metal ions in addition to, or in lieu of Pb(II) and may bind selectively or collectively. In one embodiment, the additional metal ion may be any ion which is suitably coordinated by the crosslinked polymer disclosed herein in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), or a post-transition metal (Al, Sn, In, etc.). Preferably the additional metal ion is a transition metal ion, most preferably a heavy metal ion.

As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the crosslinked polymer). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the heavy metal ion is removed by physisorption with the crosslinked polymer of the current disclosure, meaning the process is primarily physical and preferably no chemical changes occur on the crosslinked polymer or the metal ion.

In some embodiments, a resin of the crosslinked polymer described herein is crushed to form particles of the crosslinked polymer before contacting the aqueous solution having an initial concentration of the heavy metal. The crushing process may be carried out by utilizing a grinding method, e.g. fluid energy milling, ball milling, wet milling, and cryogenic grinding. As used herein, a particle size refers to the longest linear distance measured from one point on the particle though the center of the particle to a point directly across from it. In one or more embodiments, the crosslinked polymer has an average particle size of 1-10 μm in diameter, preferably 2-9 μm, preferably 3-8 μm, preferably 4-7 μm, preferably 5-6 μm in diameter. Methods for analyzing a distribution of particle size include, but are not limited to, dynamic light scattering (DLS), laser diffraction, ultrasonic attenuation spectroscopy, aerosol mass spectrometry, and sieve analysis. The particle size of a polymer may be further visualized with microscopic techniques, such as polarized light microscopy and scanning electron microscopy (SEM), and dynamic image analysis (DIA).

In one or more embodiments, the method for removing heavy metal is carried out in an aqueous solution having a pH in the range of 1 to 7, preferably a pH in the range of 2 to 6, more preferably a pH in the range of 3 to 5.

In a preferred embodiment, the crosslinked polymer is effective in removing heavy metal from aqueous samples wherein the initial concentration of the heavy metal ion, preferably Pb(II), in the aqueous solution is in the range of 0.01-100 mg $L^{-1}$, preferably 0.1-50 mg $L^{-1}$, preferably 1-40 mg $L^{-1}$, preferably 3-30 mg $L^{-1}$, preferably 5-20 mg $L^{-1}$, preferably 10-15 mg $L^{-1}$.

In one or more embodiments, the crosslinked polymer of the current disclosure is present in the aqueous solution at a concentration in the range of 0.1-25 grams per liter volume of the aqueous solution during the contacting, preferably 0.5-20.0 g $L^{-1}$, preferably 1.0-15.0 g $L^{-1}$, preferably 3.0-10.0 g $L^{-1}$, or about 1.5 grams per liter volume of the aqueous solution during the contacting.

In a preferred embodiment, the crosslinked polymer of the present disclosure is contacted with the aqueous solution for 0.1-12 hours, preferably 0.25-8 hours, preferably 0.5-6 hours, preferably 1-4 hours, preferably 2-3 hours.

In one or more embodiments, the crosslinked polymer of the present disclosure is effective in adsorbing heavy metal ions in an aqueous solution within a temperature range of 10-90° C., preferably 20-80° C., preferably 25-75° C., preferably 30-60° C. In a preferred embodiment, the method for removing heavy metal of the current disclosure is equally effective over the temperature ranging from 25° C. to 65° C.

In one or more embodiments, greater than 40% of a total mass of the heavy metal is removed from the aqueous solution at the end of the adsorption process following contacting, preferably greater than 45%, preferably greater than 50%, preferably greater than 60%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the heavy metal is removed from the aqueous solution at the end of the adsorption process following contacting.

In one or more embodiments, the adsorption of Pb(II) in an aqueous solution increases by going from using a crosslinked polymer comprising polycondensed units of melamine, piperazine, and formaldehyde (i.e., MPF) to one comprising polycondensed units of bisphenol-S, piperazine, and formaldehyde (i.e., BSPF). In a preferred embodiment, the first monomer is piperazine, the second monomer is bisphenol-S, and the aldehyde is formaldehyde, and the aqueous solution has Pb(II) and at least one additional heavy metal ion, which is an ion of at least one heavy metal selected from the group consisting of Cd, As, Zn, Cu, Ni, Co, Mn, and Cr, and greater than 95% of a total mass of Pb(II) is removed from the aqueous solution, preferably greater than 96%, preferably greater than 97%, preferably greater than 98%, preferably greater than 99%, preferably greater than 99.8% of a total mass of Pb(II) is removed from the aqueous solution.

Adsorption is a key mechanism of removing heavy metals in the present disclosure, which requires contact between the adsorbent material (crosslinked polymer) and the target adsorbate (heavy metal ions). There is generally an increase in the removal efficiency with increasing agitation speed until a certain level. In certain embodiments, the method further comprises agitation of the aqueous solution before, during or after the contacting. The agitation may encompass shaking, stirring, rotating, vibrating, sonication and other means of increasing contact between the crosslinked polymer of the current invention and heavy metal ions. Further, the agitation can be performed manually or mechanically. In one embodiment, the treatment and contacting process may be enhanced by mechanical shaking or agitation, preferably by a bath shaker at a speed of up to 1000 rpm, preferably up to 750 rpm, preferably up to 500 rpm, preferably 50-450 rpm, preferably 75-375 rpm, preferably 100-300 rpm in order to increase contact between the crosslinked polymer and heavy metal ions.

In a preferred embodiment, the method further comprises recovering and reusing a heavy metal loaded crosslinked polymer after an around of adsorption process. In certain embodiments, the heavy metal loaded crosslinked polymer may be obtained from the aqueous solution with methods including, but not limited to, filtration, centrifugation, evaporation, heated evaporation and the like, preferably filtration or centrifugation, most preferably filtration. In certain embodiments, the obtained heavy metal loaded crosslinked polymer may be washed several times with an appropriate solvent to remove all materials present after each round of heavy metal absorption before being regenerated and reused and/or recycled in another round of removal of heavy metal ions from an aqueous solution.

The examples below are intended to further illustrate procedures for preparing and characterizing the crosslinked polymers of the present disclosure, and assessing the method for heavy metal removal using these crosslinked polymers. They are not intended to limit the scope of the claims.

Example 1

Materials and Equipment

Bisphenol-S (4,4'-sulfonyldiphenol), piperazine, melamine, paraformaldehyde, dimethylformamide (DMF) were used as received without purification. Solvents and other chemicals used were of analytical grade. The wastewater was collected from Dammam second industrial zone (Saudi Arabia). Elemental analysis results were performed using a Perkin-Elmer Elemental Analyzer Series II Model 2400. DSC and TGA were performed on a NETZSCH Thermal Analyzer, models DSC 204 F1 Phoenix and TG 209 F1 Libra, respectively. FT-IR and NMR analysis were obtained by using a Perkin Elmer 16F PC FT-IR and Bruker WB-400 spectrometers, respectively. SEM images were collected using a TESCAN LYRA 3 (Czech Republic) equipped with an energy-dispersive X-ray spectroscopy (EDX) detector model X-Max. X-ray analysis was performed on a Rigaku Rint D/max—2500 diffractometer using Cu Kα radiation (wavelength=1.5418 A). Surface area was measured by a Micrometrics TriStar III BET surface area analyzer using Bumauer-Emmett-Teller (BET) $N_2$ method.

Example 2

Synthesis of Cross-Linked Polymers

BSPF and MPF cross-linked polymers were produced from Mannich polycondensation reaction [Mannich C, Krosche W. Ueber ein Kondensationsprodukt aus Formaldehyd, Ammoniak und Antipyrin. Archiv der Pharmazie 1912; 250: 647-67, incorporated herein by reference in its entirety] as illustrated in FIG. 1. The polycondensation reactions took place via an amino alkylation of an acidic proton on formaldehyde by a primary or secondary amine. The condensation procedure of each cross-linked polymer is presented here in details below. The procedure was then evaluated by the calculation of the yield. Elemental analysis was performed directly on the dried samples of each polymer.

(i) Synthesis of Bisphenol-S Paraformaldehyde Piperazine (BSPF) Polymer

A solid mixture of piperazine (16 mmol, 1.38 g) and paraformaldehyde (33 mmol, 0.962 g) was dissolved in 15 mL DMF and stirred for 30 min to form a first solution. Bisphenol-S (8 mmol, 2.00 g) dissolved in 15 mL DMF was then added to the first solution. The mixture was then stirred in an oil bath at 90° C. for 24 h. A white solid appeared when the reaction temperature reached 40° C. that was observed to turn beige in color after 2 h. The beige solid was collected and washed with water and ethanol several times, then dried at 65° C. under vacuum until a constant weight was achieved (3.26 g, 75%) (FIG. 1). Elemental analysis for BSPF: C (%), 56.16; H (%), 6.44; N (%), 10.84; S (%), 6.37.

(ii) Synthesis of Melamine, Paraformaldehyde, Piperazine Cross-Linked Terpolymer (MPF)

A solid mixture of piperazine (30 mmol, 2.58 g), paraformaldehyde (60 mmol, 1.80 g) and melamine (10 mmol, 1.26 g) was dissolved in 25 mL DMF. The solution was stirred at 90° C. for 24 h. A beige colored resinous material was observed after stirring for 5 h. The solid product was filtered, washed with acetone and ethanol several times and dried at 65° C. under vacuum until a constant weight was achieved (3.92 g, 77%) (FIG. 1). Elemental analysis for MPF: C (%), 46.37; H (%), 7.23; N (%), 34.82; S (%), 0.0.

Example 3

Characterization of Cross-Linked Polymer: IR Spectroscopy

Figure 2:
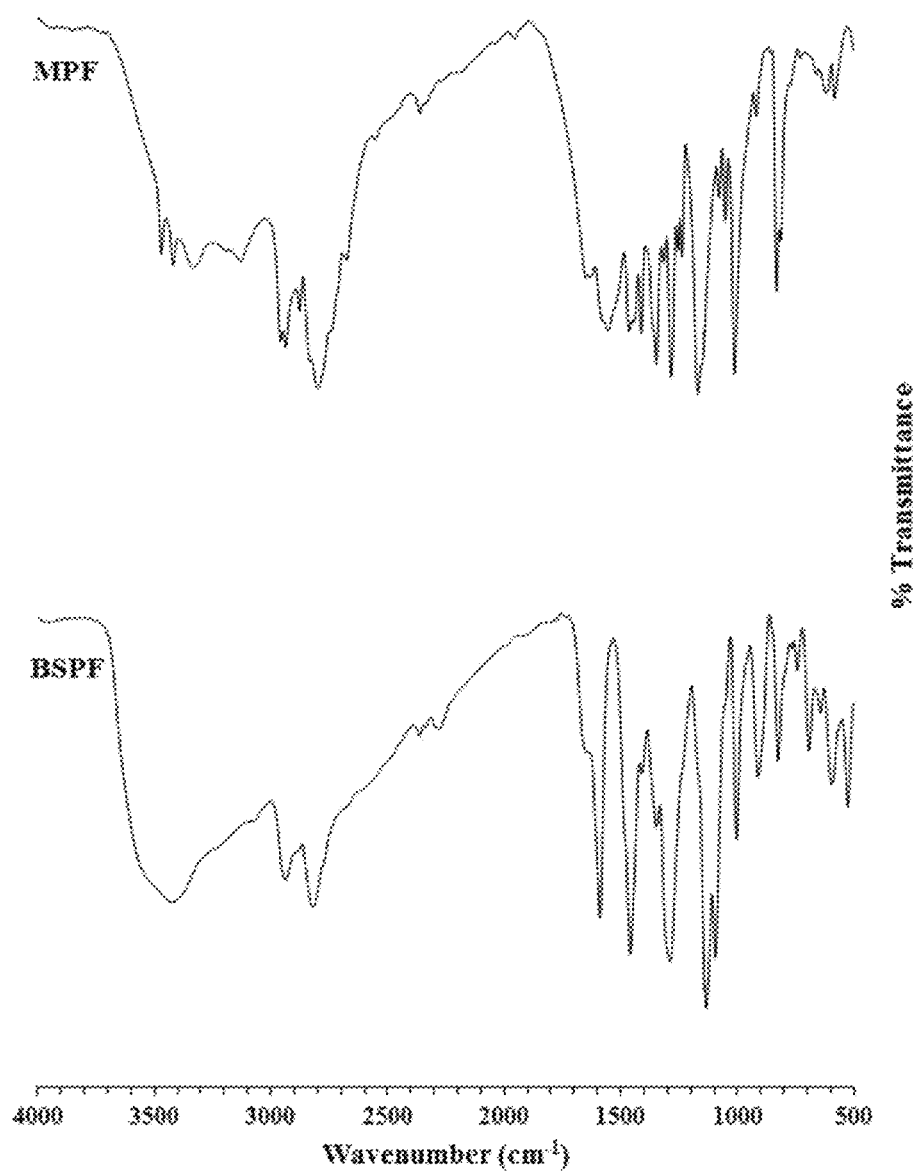
FIG. 2 is an overlay of Fourier transform infrared (FT-IR) spectra of the crosslinked polymers BSPF and MPF.

The cross-linked polymers were found to be insoluble in acidic, basic, polar and nonpolar solvents. Their solid FT-IR spectra were recorded and presented in FIG. 2. Spectra of BSPF revealed the presence of a broad, strong band at ~3430 $cm^{-1}$ due to —OH and —NH stretching vibrations [Brunovska Z, Liu J P, Ishida H. 1,3,5-Triphenylhexahydro-1,3,5-triazine—Active intermediate and precursor in the novel synthesis of benzoxazine monomers and oligomers. Macromol Chem Phys 1999; 200(7): 1745-52, incorporated herein by reference in its entirety]. Moreover, the symmetric and asymmetric vibrations of S=O were assigned to bands at ~1130 $cm^{-1}$ and ~1290 $cm^{-1}$ [Al-Hamouz O C S, Ali S A. Aqueous two-phase systems of pH-responsive Poly[sodium (diallylamino)methylphosphonate-alt-sulfur dioxide] cyclopolymer with Poly(oxyethylene). J Chem Eng Data 2013; 58(5): 1407-16, incorporated herein by reference in its entirety]. The C—N absorption frequency was assigned to the band at ~1460 $cm^{-1}$. Spectra of MPF revealed the presence of two stretching vibrational bands at 3418-3469 $cm^{-1}$ resulting from the free secondary amines of the melamine moiety in the terpolymer. Aliphatic C—H stretching vibrations from the piperazine rings and the $CH_2$ linkages were assigned to the bands at 2877-2937 $cm^{-1}$. The C=N stretching vibrational frequency appeared at 1555 $cm^{-1}$. Aliphatic C—N stretching was assigned to the peak at 1464 $cm^{-1}$ [Akintola O S, Saleh T A, Khaled M M, Al Hamouz O C S. Removal of mercury(II) via a novel series of cross-linked polydithiocarbamates. J Taiwan Inst Chem Eng 2016; 60: 602-16; and Azarudeen R S, Subha R, Jeyakumar D, Burkanudeen A R. Batch separation studies for the removal of heavy metal ions using a chelating terpolymer: Synthesis, characterization and isotherm models. Sep Purif Technol 2013; 116: 366-77, each incorporated herein by reference in their entirety].

Example 4

Characterization of Cross-Linked Polymer: NMR Spectroscopy

Figure 3:
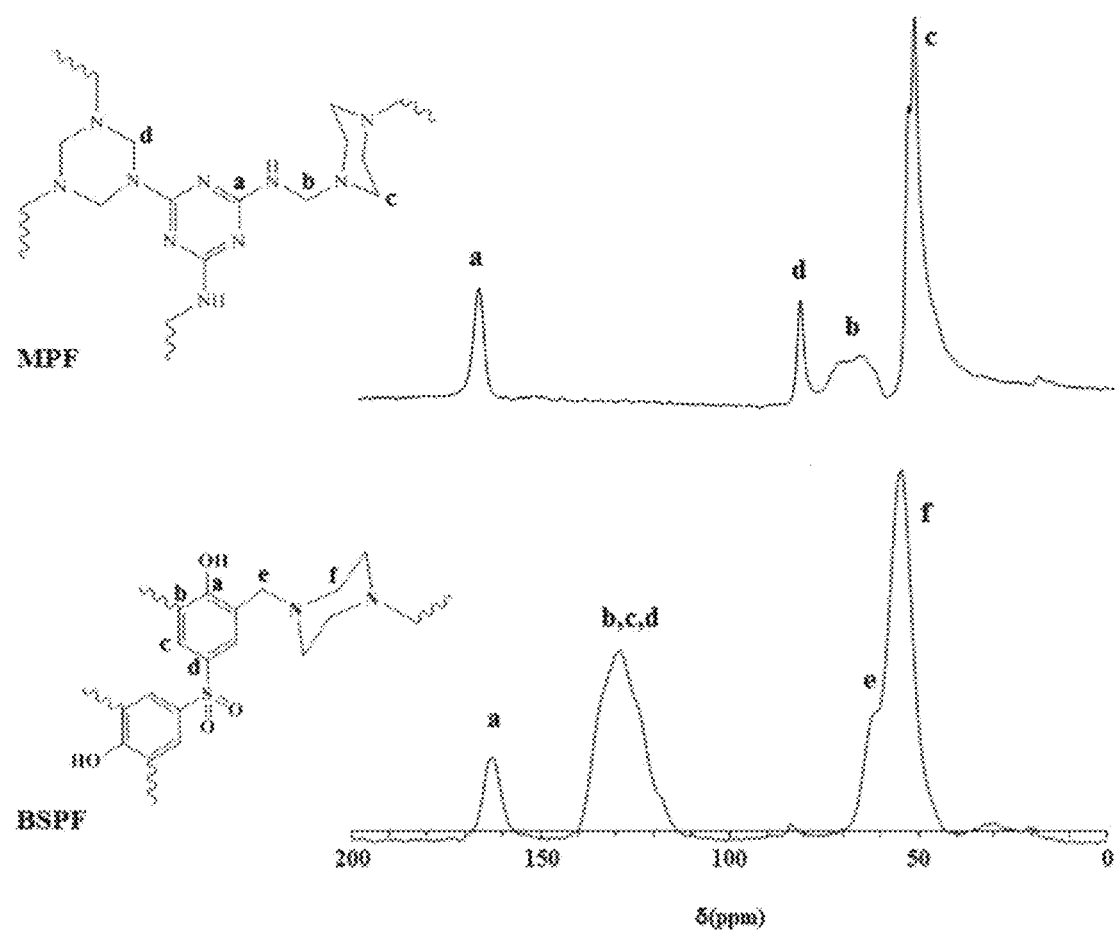
FIG. 3 is an overlay of solid-state $^{13}C$ nuclear magnetic resonance ($^{13}C$ NMR) spectra of the crosslinked polymers BSPF and MPF.

Solid state $^{13}C$ NMR spectra were obtained using a Bruker WB-400 spectrometer with a spinning rate of 10 kHz and shown in FIG. 3. The assignment of peaks and spectra confirmed the proposed structures of each polymer. The peak at ~80 ppm (d-peak of MPF) revealed the formation of a triazine ring in MPF. The peak at ~130 ppm in the spectrum of BSPF is attributed to the aromatic bisphenol-S [Rego R, Adriaensens P J, Carleer R A, Gelan J M. Fully quantitative carbon-13 NMR characterization of resol phenol-formaldehyde prepolymer resins. Polymer 2004; 45: 33-8; Chuang I S, Maciel G E, Myers G E. Carbon-13 NMR study of curing in furfuryl alcohol resins. Macromolecules 1984; 17: 1087-90; and Chutayothin P, Ishida H. Polymerization of p-cresol, formaldehyde, and piperazine and structure of monofunctional benzoxazine-derived oligomers. Polymer 2011; 52(18): 3897-904, each incorporated herein by reference in their entirety]. Additionally, tertiary aromatic a-peak and secondary-cyclic and acyclic e- and f-peaks exist in both polymer types.

Example 5

Characterization of Cross-Linked Polymer: TGA and DSC

Figure 4:
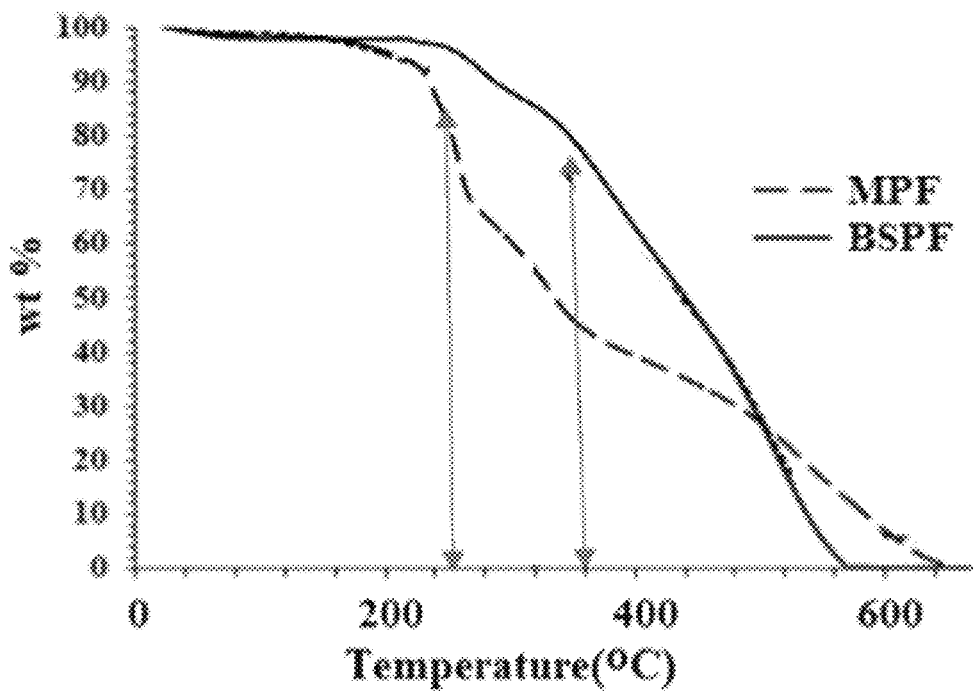
FIG. 4 is an overlay of thermogravimetric analysis (TGA) of the crosslinked polymers BSPF and MPF.
Figure 5:
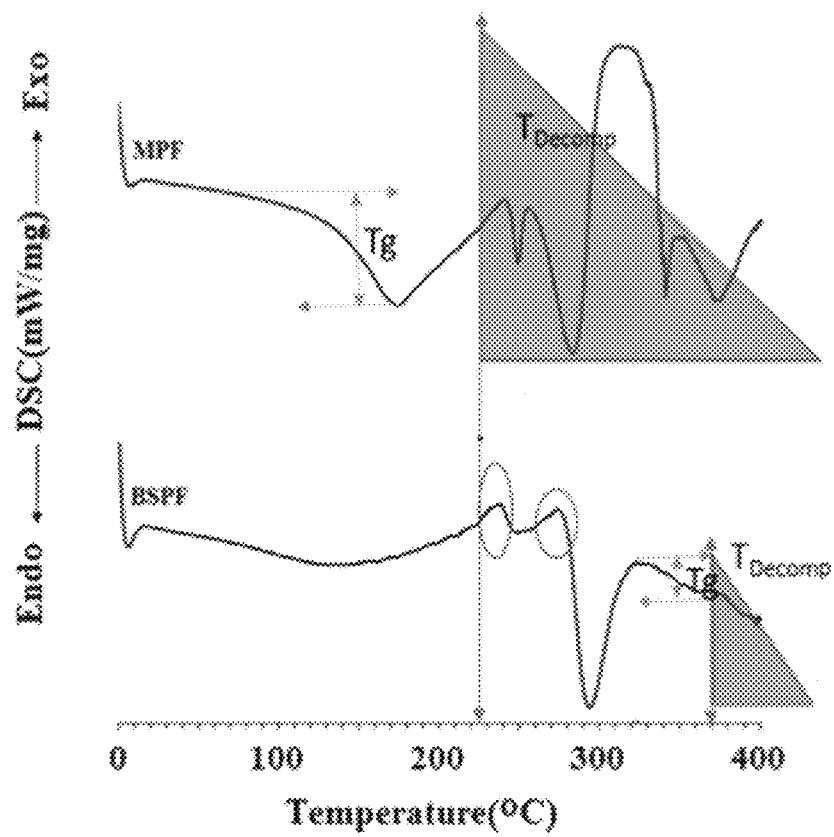
FIG. 5 is an overlay of differential scanning calorimetry (DSC) thermograms of the crosslinked polymers BSPF and MPF, in which $T_g$ denotes glass transition temperature and $T_{Decomp}$ indicates decomposition temperature.

The thermal properties of the synthesized polymers were investigated by TGA and DSC (see FIGS. 4 and 5). The thermogravimetric analysis (TGA) revealed that BSPF has a higher thermal stability as their thermal degradation starts at ~370° C., compared to MPF, which shows lower thermal degradation temperature at ~230° C. Thus the presence of the bisphenol-S moiety increases the thermal stability of cross-linked polymers. This was confirmed by the differential scanning calorimetry (DSC) measurements as depicted in the thermograms (FIG. 5). The elevation in the glass transition temperatures ($T_g$'s) from 150° C. of MPF to 350° C. of BSPF polymer is consistent with the trend of thermal stability observed in TGA data. Together, these results support the proposed crosslinking patterns illustrated in FIG. 1. In addition, the observed elevation in Tg values and its correlation with the movability and flexibility of polymer chains are consistent with previously reported polysulfone systems [Dennis J M, Fahs G B, Moore R B, Turner S R, Long T E. Synthesis and characterization of polysulfone-containing Poly(butylene terephthalate) segmented block copolymers. Macromol 2014; 47(23): 8171-7, incorporated herein by reference in its entirety].

The DSC thermogram of BSPF shows a few exothermic peaks during the heating process (indicated with ellipses in FIG. 5) until $T_g$-values are approached. These exothermic peaks could be attributed to solid-solid conformational changes to the direction of forming more stable solid conformers upon approaching the melting or glass transition temperature. This further supports the predicted cross-linking in the BSPF polymer, which could be attributed to a solid-solid conformation polymer transition. The results are in good agreement with the reported DSC-conformations of a series of biphenyl liquid crystalline molecular systems [Morsy M A, Oweimreen G A, Al-Tawfiq A M. Electron paramagnetic resonance and Ab initio structural studies on liquid crystalline systems. J Phys Chem 1998; 102B: 3684-91; and Oweimreen G A, Morsy M A. DSC studies on p-cyanophenyl p-(n-alkyl)benzoate liquid crystals: Evidence for polymorphism and conformational change. Thermochim Acta 1999; 325(1999): 111-18, each incorporated herein by reference in their entirety]. Also, the DSC-thermogram patterns of these polymers appeared to be irreversible processes. The complexity of these patterns of the MPF polymer could be correlated with its instability, which is attributed to the absence of flexible aliphatic fragments. As reported [Baranek A D, Kendrick L L, Narayanan J, Tyson G E, Wand S, Patton D L. Flexible aliphatic-bridged bisphenol-based polybenzoxazines. Polym Chem 2012; 3(10): 2892-900, incorporated herein by reference in its entirety], the presence of rigid aromatic segments in BSPF cross-links reduces the complexity in their DSC-thermograms.

Figure 6:
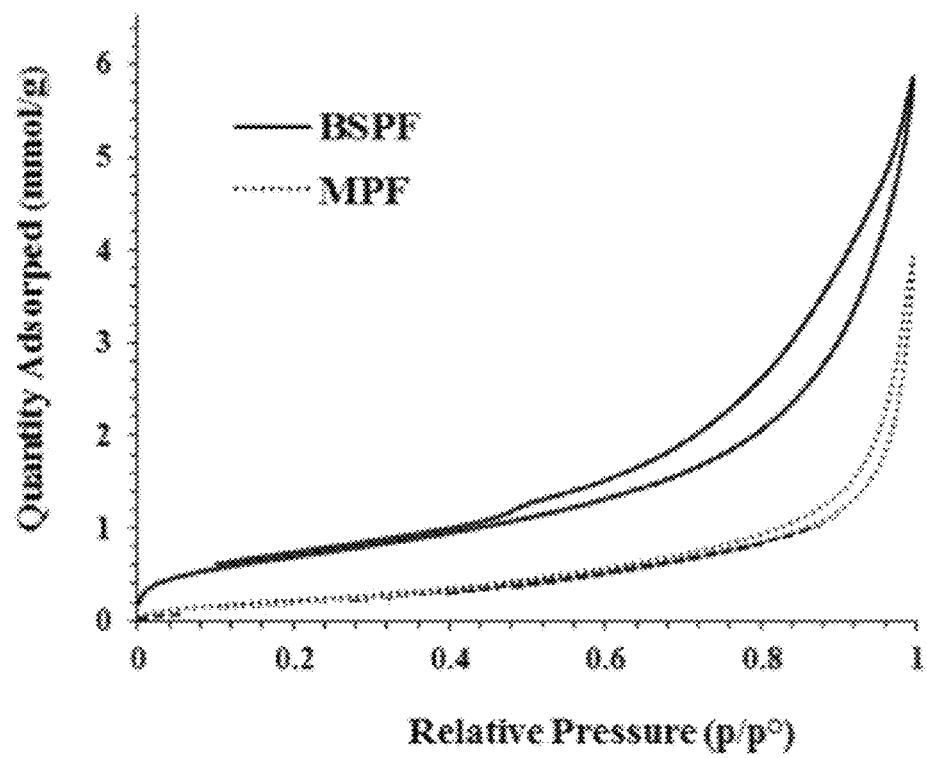
FIG. 6 is an overlay of BET $N_2$ adsorption-desorption isotherms of the crosslinked polymers BSPF and MPF at 77 K.
Figure 7:
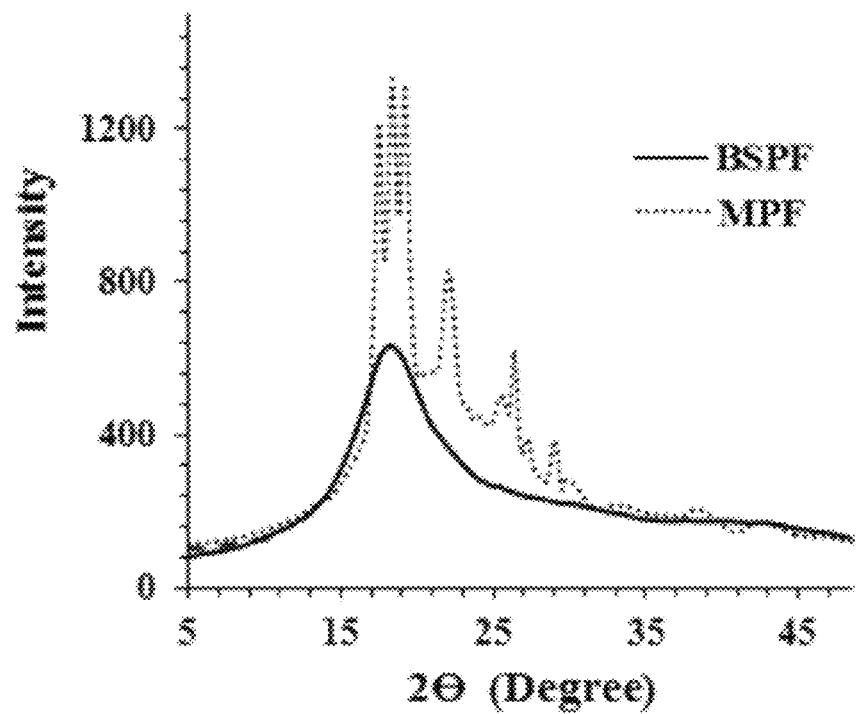
FIG. 7 is an overlay of X-ray diffraction (XRD) patterns of the crosslinked polymers BSPF and MPF.
Figure 8A:
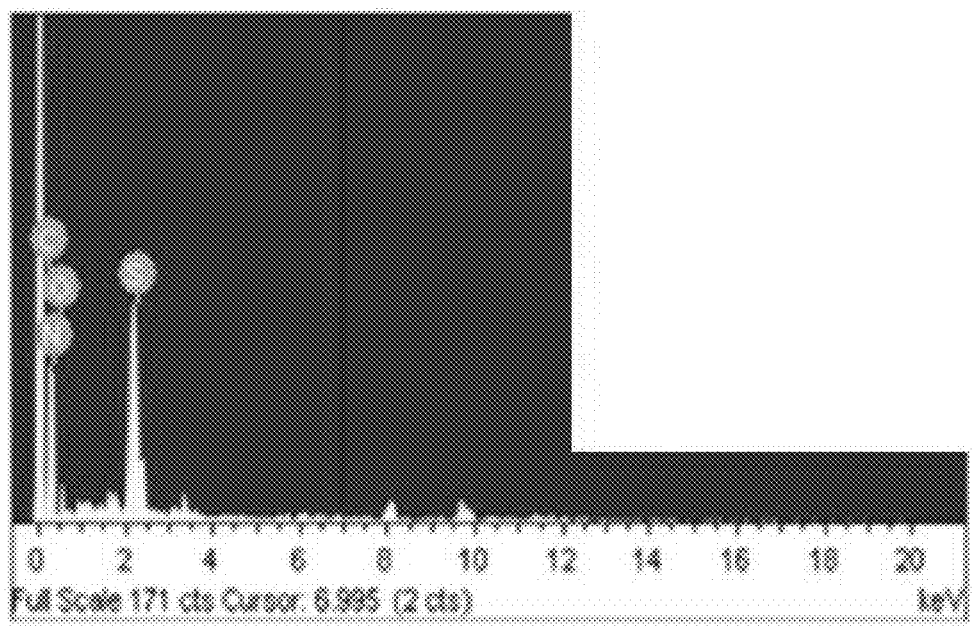
FIG. 8A is a scanning electron microscopy-energy dispersive X-ray spectroscopy (SEM-EDX) elemental analysis of the crosslinked polymer BSPF.
Figure 8B:
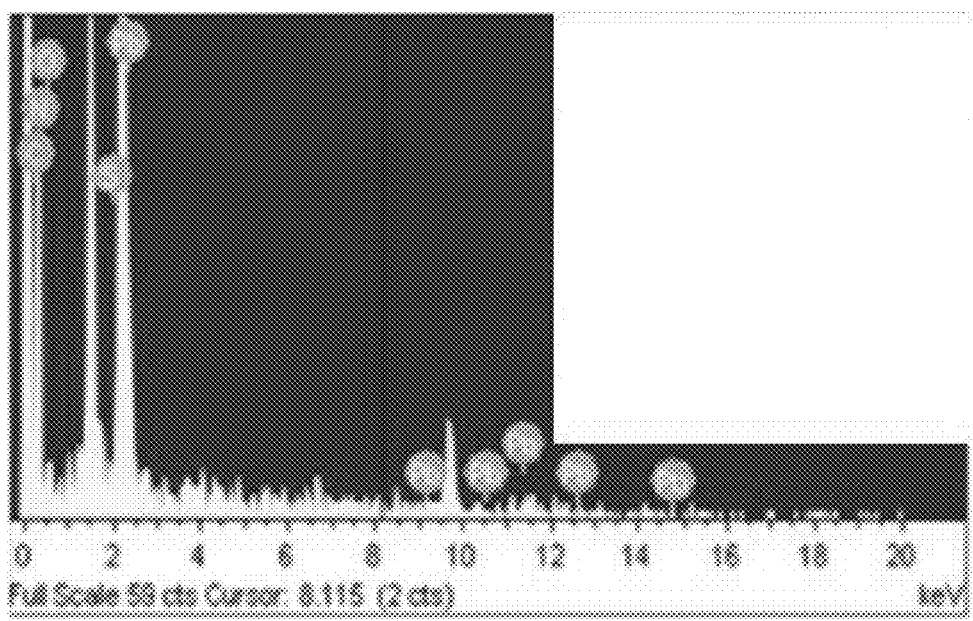
FIG. 8B is a SEM-EDX elemental analysis of the crosslinked polymer BSPF after its adsorption of Pb(II).
Figure 9A:
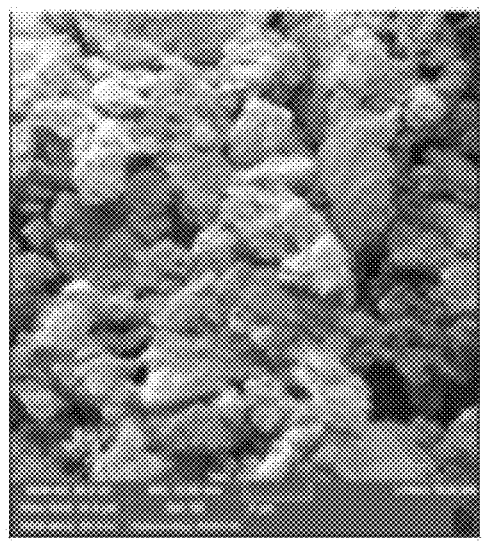
FIG. 9A is a SEM-EDX micrograph image of the crosslinked polymer BSPF.
Figure 9B:
FIG. 9B is a SEM-EDX micrograph image of the crosslinked polymer BSPF after its adsorption of Pb(II).

FIGS. 6 and 7 show the surface area and the XRD results of the cross-linked polymers. The analysis revealed that BSPF cross-linked polymer is mesoporous in nature and has a higher surface area of 57.6 m²/g, while MPF is considered to have a macro-porous character with a surface area of 19.1 m²/g. The surface area isotherms provide valuable information as it agrees with the high efficiency of BSPF in the removal of lead ions from aqueous solutions [Sing K S W, Everett D H, Haul R A W, Moscou L, Pierotti R A, Rouquerol J, et al. Reporting physisorption data for gas/solid systems with special reference to the determination of surface area and porosity (Recommendations 1984). Pure Appl Chem 1985; 57(4): 603-19, incorporated herein by reference in its entirety]. X-ray diffraction (XRD) patterns revealed that BSPF is amorphous in nature which confirms the presence of solid-solid conformational transitions observed in its DSC pattern. The XRD pattern indicated that MPF is semi-crystalline in nature, which is in good agreement with the DSC results that revealed the absence of solid-solid conformational transitions.

Example 6

Adsorption Experiments

A design of experiment (DOE) was created to investigate and evaluate various experimental factors including polymer type, pH of the solution, concentration, and temperature and their interactions on lead ions removal with 95% confidence limit. The DOE is considered more informative than one-variable-at-a-time experimental procedures since the latter does not give any indication of the interaction between the factors. In this analysis, the adsorption-determining factors are polymer type (MPF=0, BSPF=1) of 30 mg suspended dose, pH (3, 5, and 7), lead ion initial concentration (0.2, 2.6 and 5 ppm) and the adsorption temperature (298, 318 and 338 K). The low and high levels of pH were selected as 3 and 7 because at pH>7 lead ion removal can be accomplished by concomitant precipitation and sorption at a fixed time for each experiment of 30 min. The low and high levels of the lead ion initial concentration were selected to simulate real industrial wastewater samples. The percentage removal of the lead ion with each polymer under certain conditions is the response variable in this study. The type of design was a 2-level factorial (default generators) with the full factorial design option that was carried out by using generated data in Table 1 following the same adsorption process described above.

TABLE 1

Design matrix of the factorial design and their corresponding parameters

| Factor | Low level (−1) | High level (+1) |
|---|---|---|
| (A) Polymer type | −1 | +1 |
| (B) pH | 3 | 7 |
| (C) Lead initial concentration (ppm) | 0.2 | 5 |
| (D) Temperature (K) | 298 | 338 |

| Run | (A) Polymer | (B) pH | (C) Lead initial concentration (ppm) | (D) Temperature (K) | Percentage removal (%) |
|---|---|---|---|---|---|
| 1 | 1 | 7 | 0.2 | 298 | 99.7 |
| 2 | −1 | 3 | 5.0 | 298 | 2.8 |
| 3 | −1 | 7 | 0.2 | 338 | 99.6 |
| 4 | 1 | 3 | 5.0 | 338 | 44.9 |
| 5 | 0 | 5 | 2.6 | 318 | 31.8 |
| 6 | −1 | 3 | 0.2 | 298 | 66.6 |
| 7 | 1 | 7 | 5.0 | 298 | 33.8 |
| 8 | 1 | 3 | 0.2 | 338 | 42.0 |
| 9 | −1 | 3 | 5.0 | 338 | 54.6 |
| 10 | 0 | 5 | 2.6 | 318 | 38.2 |
| 11 | −1 | 7 | 0.2 | 298 | 99.6 |
| 12 | 1 | 3 | 5.0 | 298 | 25.5 |
| 13 | 1 | 7 | 0.2 | 338 | 99.7 |
| 14 | −1 | 3 | 5.0 | 338 | 42.0 |
| 15 | 0 | 5 | 2.6 | 318 | 40.0 |
| 16 | 1 | 3 | 0.2 | 298 | 96.9 |
| 17 | −1 | 7 | 5.0 | 298 | 42.5 |
| 18 | −1 | 3 | 0.2 | 338 | 33.7 |
| 19 | 1 | 7 | 5.0 | 338 | 55.2 |
| 20 | 0 | 5 | 2.6 | 318 | 39.9 |

Example 7

Efficiency of Lead Removal (Adsorption Experiment)

The adsorption performance of the prepared polymers was evaluated as per the following procedure. A 5 ppm stock solution of lead ions was prepared by diluting a 1000 ppm lead standard solution with an acidified distilled water containing 0.1 M $HNO_3$ to avoid any concomitant precipitation of lead in hydroxide form. Several parameters have been examined for the adsorption experiment. This experiment was conducted on two levels. The first level was via factorial design that covers the most important four factors namely, polymer type, pH, temperature, and lead loading, and will be discussed in details in factorial design section. The second level is focused on the dose or mass of the suspended polymer. For the second level, a series of 20 mL acidified 0.2 ppm lead solution containing a specified amount of mechanically crushed BSPF polymer of 20-60 mg was prepared in a suspension form. The average size of the suspended polymer was ~2 μm in diameter as shown in the scanning electron microscopy (SEM) images using TES-CAN LYRA 3 equipped with an energy-dispersive X-ray spectroscopy (EDX). FIGS. 8A, 8B, 9A, and 9B show EDX-elemental analysis results and images of suspended BSPF polymer before and after the adsorption of lead ions.

Figure 10:
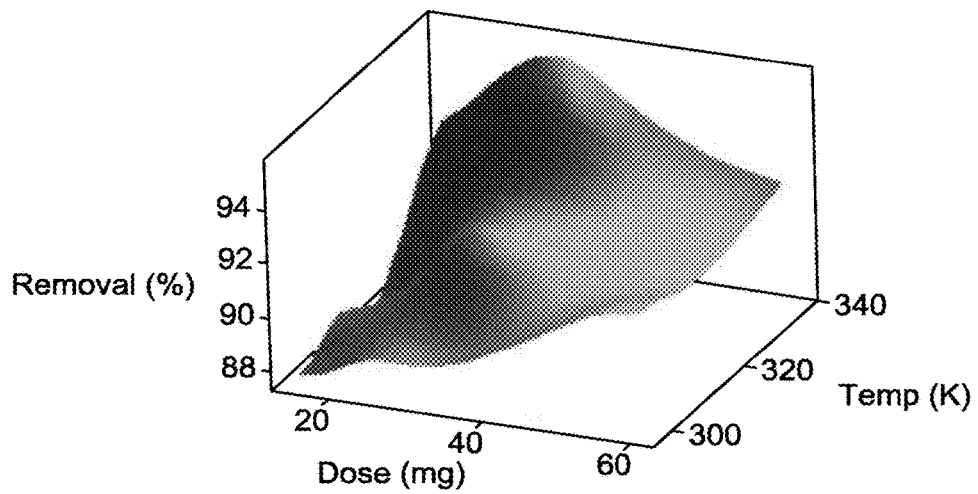
FIG. 10 is a response surface plot demonstrating the effect of temperature and dosage of the crosslinked polymer, as well as their combined impact on the removal of Pb(II).

For the adsorption part, the suspended acidified mixture of lead solution was equilibrated by shaking at a fixed temperature in a water bath shaker at a contact time of 30 min. After equilibration, the adsorbent was separated from the solution and the residual concentration of lead in the supernatant liquid was identified by ICP. The surface plot in FIG. 10 summarizes the percent of lead removal versus doses of suspended polymer of 20 to 60 mg in mass at a specific temperature within the range of 298-340 K. The results indicated that the best removal of lead was obtained by a dose of 30 mg of the suspended polymer at 338 K.

Example 8

Factorial Design

Figure 11A:
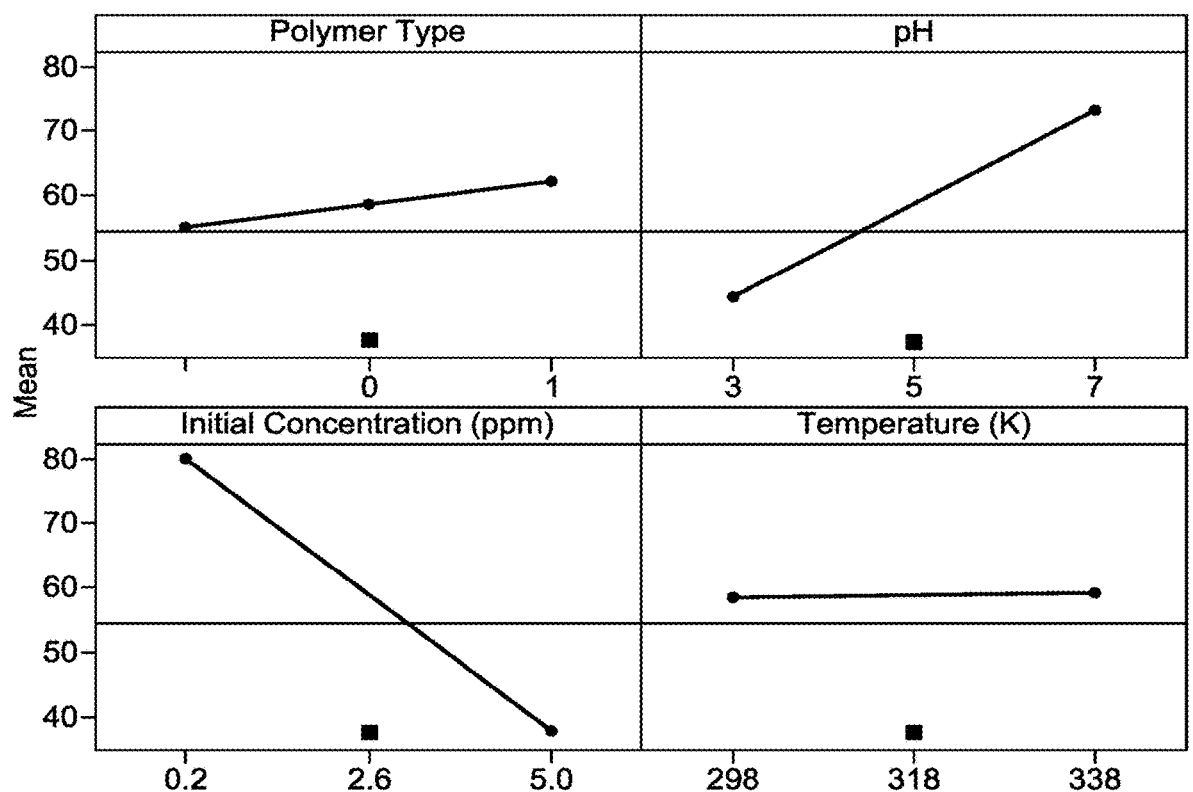
FIG. 11A summarizes main effects including polymer identity (0=MPF and 1=BSPF), pH of the aqueous solution, initial concentration of lead ion in the aqueous solution, and temperature on lead ion adsorption efficiency of the crosslinked polymer.
Figure 11B:
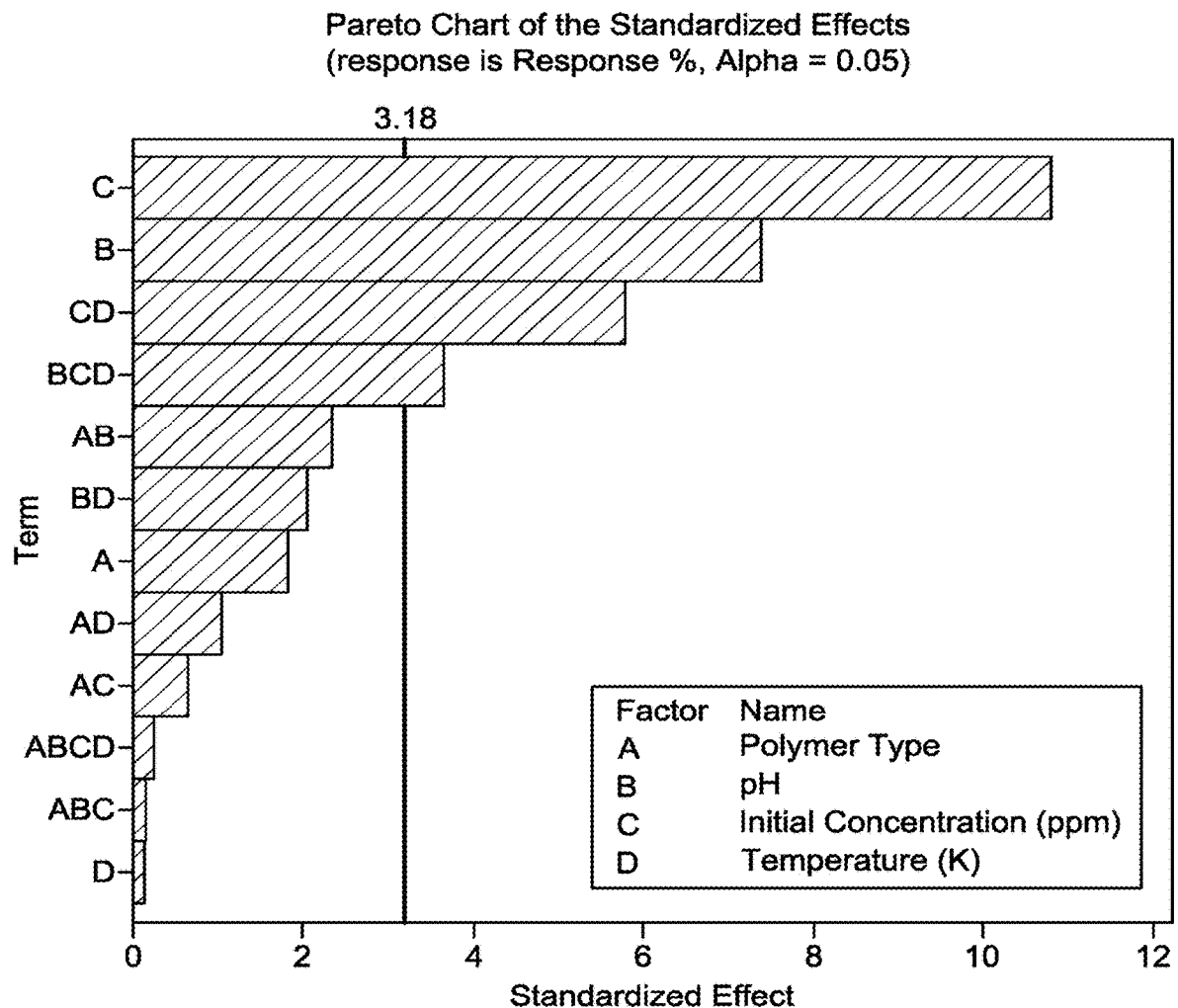
FIG. 11B depicts a Pareto chart of the standardized effect derived from the factorial design experiment.
Figure 11C:
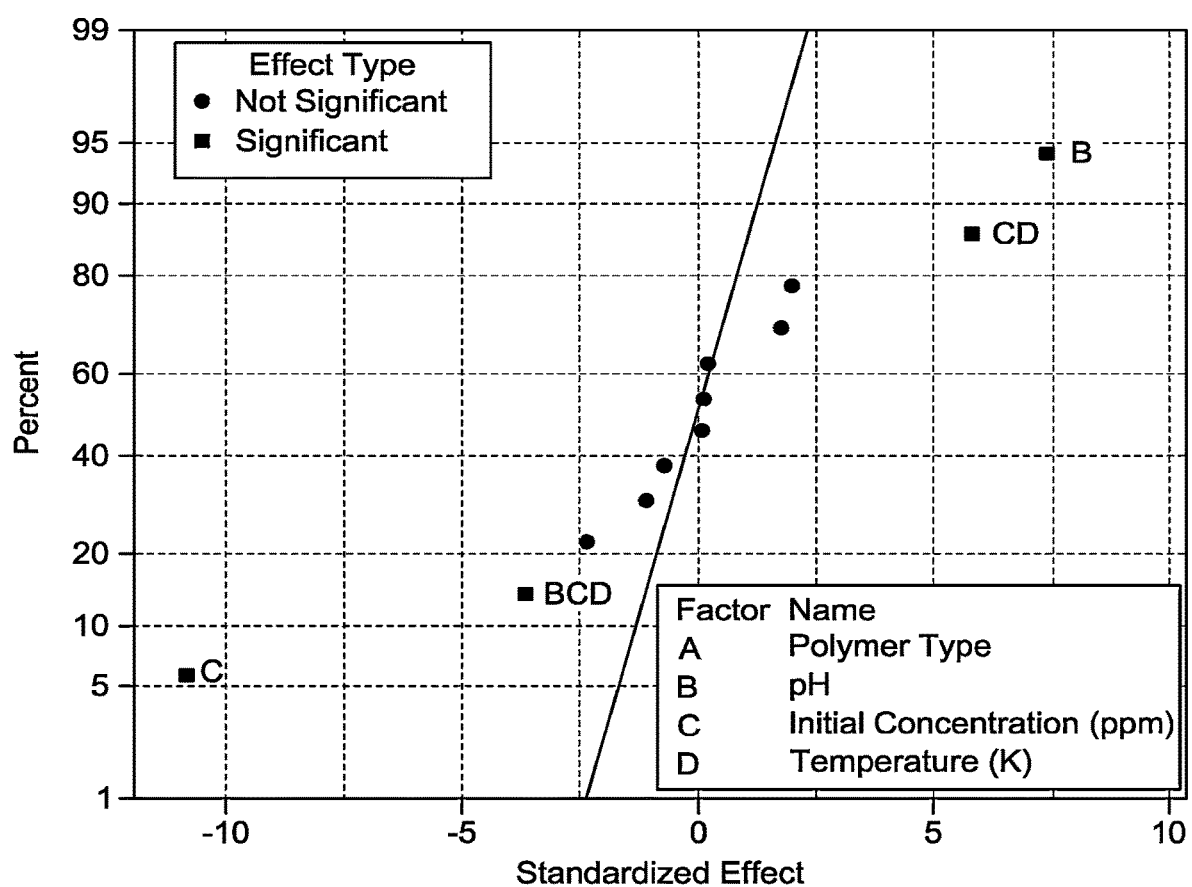
FIG. 11C depicts a normal plot of the standardized effect derived from the factorial design experiment.

FIGS. 11A, 11B, and 11C depict the factorial design plots, including main effects plot, Pareto chart, and normal plot. FIG. 11A indicated that between the tested polymers (MPF=0, BSPF=1), BSPF shows a higher adsorption efficiency. The adsorption efficiency was higher in a solution with pH at 7 than solutions with pH<7. Increasing the initial concentration of lead decreased the adsorption efficiency, indicating a need for evaluating the impact of concentration and polymer dosage. Generally, it is necessary to use larger amounts of the polymer to provide enough sites for adsorption as the initial concentration increases. As shown in FIG. 11A, the influence of temperature was not significant, implying that the polymer can function under different temperatures. FIG. 11B depicts a Pareto chart indicating the most significant parameters that influence the adsorption efficiency are initial concentration and pH. Another factor is the interaction between the initial concentration and temperature, which indicates that the removal efficiency increases by increasing the temperature at higher initial concentration. An additional significant factor is the interaction between initial concentration, pH and temperature, which suggests that at high initial concentration, the removal efficiency increases by increasing pH and temperature. FIG. 1C depicts a standardized effect of the parameters. It is observed that increasing the initial concentration had a negative effect on the adsorption efficiency while increasing the pH had a positive effect. From the factorial design, we can conclude that conditions for better removal include a low initial concentration, high pH and a slight increase in temperature. It also suggests a superior affinity of BSPF towards lead ions, which could be attributed to its highly active functionalities in the crosslink and larger pores.

Example 9

Wastewater Treatment

To evaluate the efficiency of the synthesized BSPF cross-linked polymer toward lead ions removal, adsorption tests were conducted for real wastewater samples spiked with 3 mg/L lead ions. Based on the DOE results, BSPF cross-linked polymer was selected for this wastewater treatment analysis conducted by mechanically shaking 20 mL wastewater sample and 30 mg suspended polymer for 30 min at 338 K. Table 2 shows the ICP results of the water sample before and after the treatment.

TABLE 2

Industrial wastewater from Dammam second industrial city (Saudi Arabia) spiked with 3 mg/L lead ions before and after treatment with BSPF.

| Metal | Before treatment (μg/l) | After treatment (μg/l) | Percent removal (%) |
|---|---|---|---|
| Pb (spiked) | 2690 ± 0.438 | 2.228 ± 0.438 | >99.9 |
| Cd | 0.73 ± 0.213 | 0.711 ± 0.213 | ~2.6 |
| As | 95.32 ± 7.077 | 22.78 ± 7.077 | ~76.1 |
| Zn | <MDL | <MDL | <MDL |
| Cu | 20.07 ± 9.235 | 25.36 ± 9.235 | <MDL |
| Ni | 39.38 ± 4.275 | 21.38 ± 4.275 | ~45.7 |
| Co | 2.504 ± 0.405 | 1.366 ± 0.405 | >45.4 |
| Mn | 6.632 ± 1.215 | 3.782 ± 1.215 | ~43.0 |
| Cr | 125.6 ± 3.594 | 30.81 ± 3.954 | ~75.5 |

Mean and standard deviation of three replicates (n = 3) ± values are the method detection limit (MDL), 3σ of the blank sample.

The results revealed a superior efficiency ranged from 50% to 100% of the synthesized cross-linked polymer in the removal of toxic metal ions in real wastewater conditions. BSPF almost completely removed high concentration of lead contamination (~99.9%) in the spiked wastewater sample. This efficient removal was supported by the EDX analysis results and SEM-images of the polymer, which showed all expected isotopes of lead in these samples after adsorption took place as illustrated in FIGS. 8A, 8B, 9A, and 9B. These results prove that BSPF could be utilized as an industrial adsorbent for wastewater treatment.

The invention claimed is:

1. A crosslinked polymer, in the form of a Mannich polycondensation product, comprising reacted units of a first monomer of formula (I)

(I)

or a solvate thereof, a stereoisomer thereof, or a mixture thereof;

melamine; and an aldehyde of formula (III)

(III)

wherein:
m is 2 or 3; and
n is 2 or 3;
wherein the crosslinked polymer has X number of repeating units of formula (IV);
wherein X is 2 to 10,000;
wherein * represents an amino site of an additional melamine ring;

(IV)

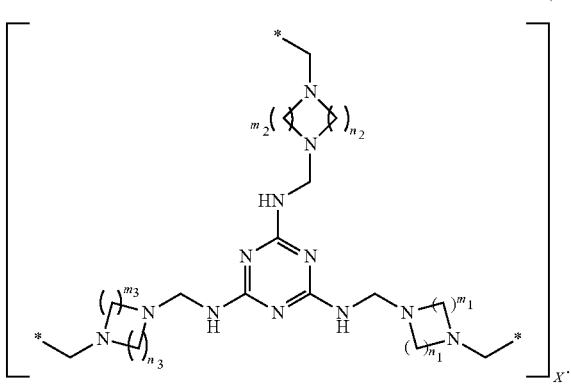

2. The crosslinked polymer of claim 1, wherein the molar ratio of the first monomer to melamine is in the range of 1.5:1 to 5:1, and the molar ratio of the aldehyde to melamine is in the range of 2:1 to 10:1.

3. The crosslinked polymer of claim 1, wherein m and n are 2.

4. The crosslinked polymer of claim 1, wherein the first monomer is piperazine.

5. The crosslinked polymer of claim 1, wherein the crosslinked polymer exhibits a semi-crystalline structure.

6. The crosslinked polymer of claim 1, consisting of the first monomer of formula (I), melamine, and the aldehyde of formula (III).

7. A method for removing a heavy metal from an aqueous solution, comprising:
   contacting the aqueous solution having an initial concentration of the heavy metal with the crosslinked polymer of claim 1 to form a mixture; and
   filtering the mixture to obtain an aqueous solution having a reduced concentration of the heavy metal compared to the initial concentration.

8. The method of claim 7, wherein the crosslinked polymer has an average particle size of 1-10 μm in diameter.

9. The method of claim 7, wherein the heavy metal is an ion of at least one heavy metal selected from the group consisting of Pb, Cd, As, Zn, Cu, Ni, Co, Mn, and Cr.

10. The method of claim 7, wherein the heavy metal is Pb(II).

11. The method of claim 7, wherein the aqueous solution has a pH in the range of 1 to 7.

12. The method of claim 7, wherein the initial concentration of the heavy metal in the aqueous solution ranges from 0.1 mg $L^{-1}$ to 50 mg $L^{-1}$.

13. The method of claim 7, wherein the crosslinked polymer is present at a concentration in the range of 0.1-10 g per liter of the aqueous solution during the contacting.

14. The method of claim 7, wherein the crosslinked polymer is contacted with the aqueous solution for 0.1-12 hours; and
   the aqueous solution has a temperature in the range of 10° C. to 80° C.

15. The method of claim 7, wherein greater than 40% of a total mass of the heavy metal is removed from the aqueous solution.

* * * * *